July 21, 1959  A. C. KRUKONIS  2,895,272
METHOD OF ASSEMBLING AND WRAPPING ARTICLES
Filed July 18, 1957
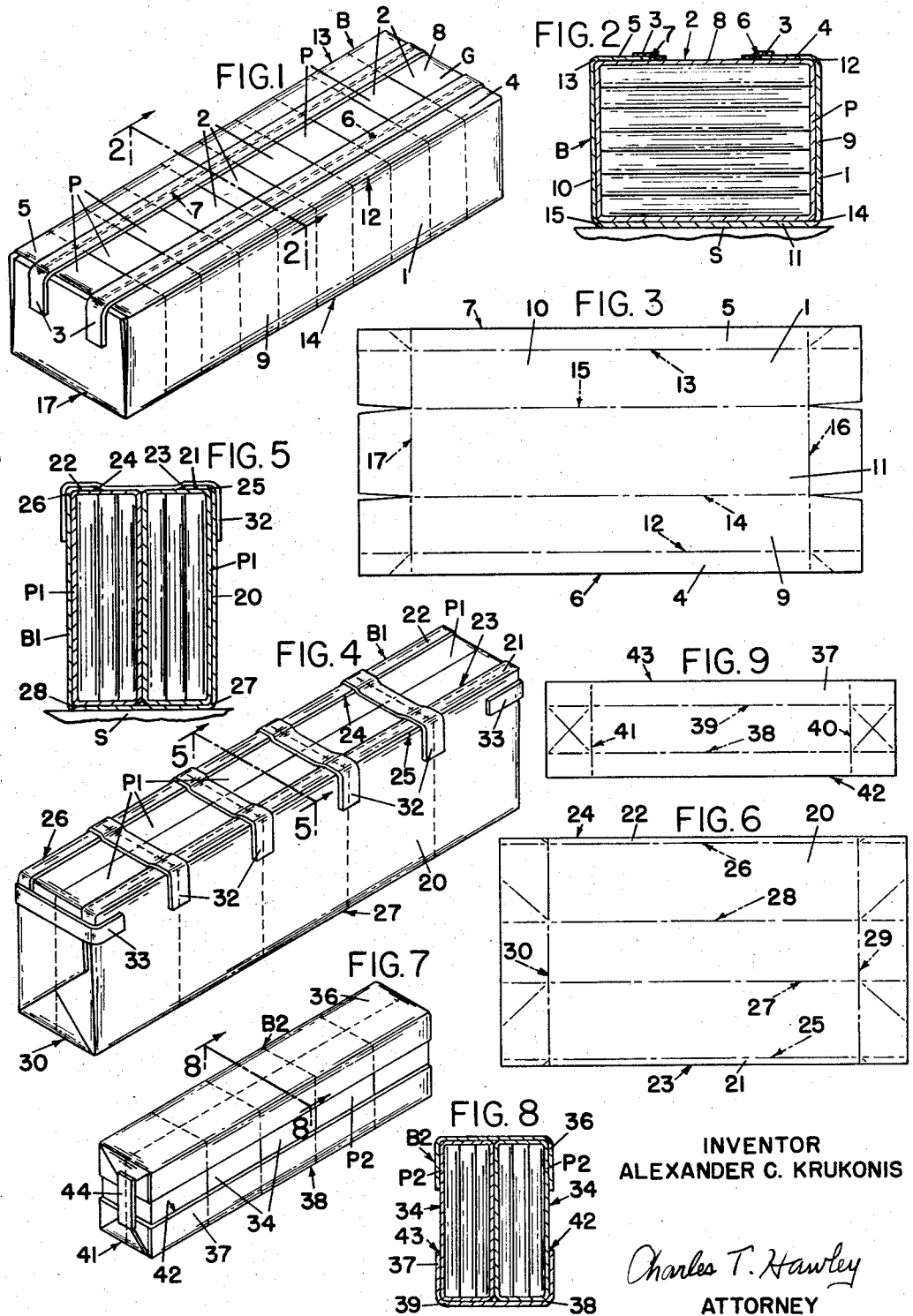
INVENTOR
ALEXANDER C. KRUKONIS
Charles T. Hawley
ATTORNEY

United States Patent Office 2,895,272
Patented July 21, 1959

2,895,272
METHOD OF ASSEMBLING AND WRAPPING ARTICLES

Alexander C. Krukonis, Auburn, Mass., assignor to Crompton & Knowles Corporation, Worcester, Mass., a corporation of Massachusetts Original application June 25, 1956, Serial No. 593,582. Divided and this application July 18, 1957, Serial No. 672,648

3 Claims. (Cl. 53—21)

This application is a division of my prior application Serial No. 593,582, filed June 25, 1956, which application relates to wrapping a group of articles in such a manner as to permit the application of a mark or stamp to each article without removing the wrapper in which the articles are held. This divisional application relates particularly to the method of assembling and wrapping articles such as, for instance, packages of cigarettes, said method not being claimed in the above identified original application.

Manufacturers and wrappers of cigarette packages usually assemble, wrap and fasten the packages in bundles or the like without making any provision for the application of an excise tax stamp to the packages, a requirement in many of the states to which the bundles may be shipped throughout the nation. Distributors in such states must unfasten and unwrap each bundle, remove the package from the wrapper, apply the stamps to the packages and rewrap the latter and fasten them into a bundle. In certain cases, the mark or stamp is applied while the wrapper is not in its complete or final position, necessitating completion of wrapping after application of the mark or stamp. These procedures are time-consuming and costly.

It is, therefore, an important object of the invention to provide a bundle or group of packages or articles which are partly enclosed in a wrapper having terminal edges between which a surface of each of the enclosed packages or articles is partially exposed thereby permitting the application of a mark or stamp without disturbing the fastener or removing the packages or articles from the bundle or wrapper and when the wrapper is in its complete and final position around the group.

Another object of the invention is to provide an improved method of making a bundle of articles in such manner that the folding of the wrapper around the articles will leave a surface of each article between the terminal edges partly unwrapped to expose said surface of each article in the bundle the wrapper being so utilized so that any part of the edges will not be covered by any other part of the wrapper.

Still another object of the invention is to provide wrapper means having a length between terminal edges less than the girth of the group of articles to be wrapped whereby, upon wrapping the articles, the edges of said wrapper means will be spaced from each other and unobstructed by any part of the wrapper on at least one side of the group to expose a substantial surface of each of the articles.

A further object of the invention is to partially expose a surface of each article by providing an opening in the bundle extending lengthwise of the latter, and defined by the aforementioned terminal edges between which a mark or stamp can be applied to each exposed surface of each article.

A still further object of the invention is to provide wrapper means consisting of two sheets of material whereby, two rows of the aforementioned articles are wrapped, the edges of one sheet will be spaced from and face the edges of the other sheet to partially expose the surfaces of certain of the articles on one side of one row of the bundle and the surfaces of certain other of the articles on another side of the other row in the bundle for the application thereto of a mark or stamp.

After the wrapper means has been placed partially around the group of articles it is a still further object of the invention to provide fastener means to hold the wrapper means in position with respect to the articles and also hold adjacent articles and rows to each other to form a strong, compact unit easy to handle and without obstructing the surfaces to be marked or stamped.

For a further understanding of the invention, reference is made to the accompanying drawing which illustrates by way of example three embodiments of the invention and in which:

Fig. 1 is a perspective view of a bundle of articles or packages illustrating the preferred form of the invention, Fig. 2 is an enlarged vertical section taken on line 2—2, Fig. 1, the contents of the package not shown in section for clarity, Fig. 3 is a plan view on a reduced scale of the wrapper for the bundle shown in Fig. 1, Fig. 4 is a perspective view of a bundle showing the first modification of the invention, Fig. 5 is an enlarged vertical section taken on line 5—5, Fig. 4, the contents of the packages not shown in section for clarity, Fig. 6 is a plan, on a reduced scale, of the wrapper for the bundle shown in Fig. 4.

Fig. 7 is a perspective view of a bundle showing the second modification of the invention, Fig. 8 is an enlarged vertical section on line 8—8 of Fig. 7, the contents of the packages not sectioned for clarity, and Fig. 9 is a plan view of the wrapper, on a reduced scale, for the bundle shown in Fig. 7.

Referring to Fig. 1, a bundle generally indicated at B has a group G of packages P substantially enclosed in a wrapper 1. The packages P are arranged side by side in a single row and each package P has a surface 2 which is in alignment with the adjacent similar surface. Each of these surfaces 2 are unobstructed by any other package in the group and is accessible for application of a mark or stamp, as will be described hereinafter. The wrapper 1 is made from a foldable sheet such as paper, cellophane, etc. and is fastened in position around the packages P by any convenient means, such as adhesive tapes 3, and its ends are folded in any well known manner as shown for instance in Fig. 1 at the left-hand end thereof.

As shown in Fig. 1 the wrapper 1 has two top flat portions 4 and 5 substantially parallel to and upon a part of the aligned surfaces 2. Portions 4 and 5 extend in a direction lengthwise of the bundle B and have terminal edges 6 and 7 respectively to define an elongated open space 8 therebetween to substantially expose surfaces 2. The distance of the wrapper between the edges 6 and 7 is shorter than the girth of the group of packages measured in a direction transverse of said edges. The wrapper 1 has front and back portions 9 and 10 respectively, see Figs. 2 and 3, contiguous with a bottom portion 11. Bundle B, Figs. 1 and 2, has top, bottom and end folds or bends 12 and 13, 14 and 15, 16 and 17 respectively which are also indicated by dot and dash lines in Fig. 3. These lines in Fig. 3 are not actually printed or otherwise present on the wrapper 1 but are merely indicated to show where the folds or bends will occur.

When a bundle is to be assembled the packages P will be grouped side by side and placed on the wrapper 1 in the space or area bounded by the lines 14 to 17 after which the portions 8 and 9 will be folded along the front and back sides respectively of the packages followed by the folding of the portions 4 and 5 along the top of the packages as seen for instance in Fig. 2. The ends of the wrapper then are folded into position to complete the wrapping. The terminal edges 6 and 7 fall short of each other for the reasons stated hereinbefore. Upon the completion of wrapping the packages the fasteners or tapes 3 are applied as suggested in Figs. 1 and 2. Parts of the tapes will adhere to the wrapper and packages simultaneously to hold the wrapper in position and adjacent packages to each other. The tapes extend along the edges 6 and 7 and hold the latter flat and surfaces 2 and are applied in a manner so as not to obstruct the surfaces to be stamped or marked.

In the first modification of the invention, referring particularly to Fig. 4, a bundle generally indicated at B1 has its packages P1 arranged end up in two rows with their flat broad sides vertical and at the front and back sides of the bundle. A wrapper 20 substantially surrounds the packages P1 and has flat top portions 21 and 22 with terminal edges 23 and 24 respectively to define an opening therebetween. Bundle B1, see Figs. 4 and 5, has top, bottom and end folds or bends 25 and 26, 27 and 28, 29 and 30 respectively which are also represented by dot and dash lines in Fig. 6 and shown therein for the same reasons given with reference to Fig. 3. Top cross tapes 32 and end tapes 33 are applied transversely of said opening to hold the wrapper 20 in position around the packages P1 and the articles with respect to each other.

When a bundle is to be made up as shown in Fig. 4 the packages P1 are grouped in two rows as illustrated in that figure and placed on the wrapper 20 in the space defined by the lines 27–30 after which the wrapper is folded around the packages in a manner similar to that explained with reference to the preferred form of the invention. The tapes 32 and 33 are then applied to firmly hold the bundle together. If desired, the bundle B1 may be held together by using the tapes illustrated in Fig. 1 and applying them along the portions 21 and 22 and thence downwardly to hold the end folds and the wrapper in position around the packages.

In the modification shown in Fig. 7 a bundle generally indicated at B2 has its packages P2 grouped in two rows in the same manner as shown in Fig. 4. In this case, however, the packages P2 are wrapped so that a broad surface 34 of one row of each package P2, Fig. 8, is exposed and its opposite surface abuts a similar surface in a manner so that a surface similar to that of 34 will be exposed in the other row. The packages are partly enclosed in wrappers 36 and 37 which are identical, but not necessarily so, and only one will be described, namely, wrapper 37. In Fig. 9 the wrapper 37 has shown thereon dot and dash lines 38–41 to indicate where the folds or bends will occur when the packages are wrapped. The wrapper 37 has terminal edges 42 and 43 which will face and be spaced from similar edges on wrapper 36 when the wrappers are in position around the packages as shown in Fig. 8. A tape 44 at the left end of the bundle, Fig. 7, holds the wrappers in fixed relationship with each other. In like manner a tape (not shown) at the other end of the bundle is employed for the same purpose as is tape 44. These tapes do not obstruct any part or portion of surfaces 34 in one row nor do they obstruct any surfaces in the other row that are similar to surfaces 34.

When a bundle is to be assembled as shown in Fig. 7 the packages P2 will be grouped as seen in that figure and set in the space bounded by lines 38 to 41. The wrapper 37 then will be partially folded up and around the packages and in like manner the wrapper 36 will be partially folded down and around the packages. Tape 44 will then be applied to the ends of the bundle to hold the end folds and wrapper in position. Tapes such as are illustrated in Fig. 1 or 4 may be used with or without tape 44 if desired.

It is to be understood that the tapes are only one means of fastening the wrappers in place, and any other means may be used, such as a wrapper having gummed surfaces adjacent its edges or made of a heat sealed thermoplastic sheet. Moreover the invention is not limited to the quantity or type of articles or arrangements thereof, as shown in the drawing. It is obvious that other quantities, types of articles or arrangements may be employed.

When the marks or stamps are to be applied to the packages (in all three forms of the invention) the bundles will be placed on a support S and the marks or stamps applied to the exposed surfaces of the packages or articles between the terminal edges of the wrappers. Each package or article will have at least a part of one surface unobstructed by any other article and accessible to receive the mark or stamp.

From the foregoing it will be seen that the invention provides a group of articles or packages wrapped in such a manner as to have at least one unobstructed and accessible surface of each article partly exposed to receive a mark, stamp or the like. The articles are partially enclosed in wrapper means having a length less than the girth of the group of articles to be wrapped, whereby, upon completion of wrapping, certain edges of the wrapper means will fall short of each other to form an open space between said edges to expose on at least one side of the group of articles surfaces for the application thereto of a mark or stamp. Also, provision is made to hold the wrapper in wrapped position while around the articles so as not to substantially obstruct the surfaces, at the same time holding adjacent articles or packages or rows of packages to each other. The invention also sets forth the method whereby the articles are arranged in a group after which wrapper means is folded around the group to leave at least part of the surface of each article unwrapped.

Having now described and ascertained the nature of the invention and in what manner the same is to be performed, it will be seen that changes and modifications may be made without departing from the scope and spirit of the invention, and what is claimed is:

1. The method of assembling and wrapping packages of cigarettes and having the packages in a group on one side of which each package will have an unobstructed surface, the method consisting in the following steps: partly enclosing said group in a wrapper having a length less than the girth of the group with the ends of the wrapper spaced from each other along said side of the group in a manner such that no other part of the wrapper will extend over any part of said ends and to expose a part of said surface of each package for application thereto of a mark or stamp, and applying fastener means along said ends and part of said surfaces to secure the packages and wrapper and said ends in fixed position with respect to each other in a manner to hold said ends flat on said part of said surfaces such that the fastener means does not substantially obstruct said part of said surface.

2. The method of assembling and wrapping similar articles having aligned, flat surfaces lying substantially in the same plane, the method consisting in the following steps; arranging two rows of articles in a group so that each of said surfaces of each row will be accessible and unobstructed by any other article in the other row in said group, preparing a wrapper having a length, between lengthwise edges of the wrapper, less than the girth of said two rows in the group of articles to be wrapped, placing said two rows in the group on the wrapper in such position that an elongated opening will be formed between the edges of the wrapper when the latter is folded in position, folding the wrapper in such a manner around the two rows in the group that said edges will face and be spaced from each other to expose part of the aligned, flat surface of each article in each row, and applying fastener means transversely of said opening to fasten the articles and wrapper and said two rows with respect to each other in a manner to hold one of said edges flat on said surfaces in one row and the other of said edges flat on said surfaces in the other row such that the fastener means does not substantially obstruct said part of said surfaces.

3. The method set forth in claim 2 wherein an additional and final step consists in applying a mark or stamp between said edges and said fastener means onto each exposed surface of each article in each row when the wrapper is fastened in its complete and final position around said group.

References Cited in the file of this patent

UNITED STATES PATENTS

| | | |
|---|---|---|
| 1,877,042 | Pearce | Sept. 13, 1932 |
| 2,119,956 | McDonnell | June 7, 1938 |
| 2,216,884 | Kott | Oct. 8, 1940 |
| 2,291,645 | Nordquist | Aug. 4, 1942 |
| 2,456,059 | Grupe | Dec. 14, 1948 |